US006948939B1

(12) United States Patent
Kogan et al.

(10) Patent No.: US 6,948,939 B1
(45) Date of Patent: Sep. 27, 2005

(54) METHOD AND APPARATUS FOR A MULTIPLE FIN STYLE CURRENT CONNECTOR

(75) Inventors: Viktor Kogan, Ellicott City, MD (US); Sean Woosley, Winter Springs, FL (US); Robert Alan Ward, Rockledge, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 10 days.

(21) Appl. No.: 10/871,480

(22) Filed: Jun. 17, 2004

(51) Int. Cl.$^7$ .......................................... H01R 41/00
(52) U.S. Cl. ......................... 439/33; 439/487; 174/93
(58) Field of Search ..................... 439/32–33, 458, 439/487; 174/93, 94 R

(56) References Cited

U.S. PATENT DOCUMENTS

| | | | |
|---|---|---|---|
| 1,759,567 A | * | 5/1930 | Dibner ........................ 439/33 |
| 3,325,588 A | * | 6/1967 | Lear ........................... 174/94 R |
| 4,582,373 A | * | 4/1986 | Harmon ........................ 439/33 |
| 5,167,534 A | | 12/1992 | Ohsumi |
| 5,209,676 A | | 5/1993 | Endo et al. |
| 5,299,958 A | | 4/1994 | Ohsumi |
| 6,394,823 B1 | | 5/2002 | Dunham et al. |
| 6,540,564 B1 | | 4/2003 | Ko |
| 6,644,978 B2 | | 11/2003 | Araki |

* cited by examiner

Primary Examiner—Truc Nguyen

(57) ABSTRACT

In one embodiment the present invention is an MLB assembly 6 that is made up of two circular terminal conductor ends 2, 4. Multiple fins 10 radially extend from each of the two circular terminal conductor ends 2, 4, and each fin on each of the two circular terminal conductor ends has a matching fin on the other of the two circular terminal ends. Multiple flexible connectors 8 are attached to the fins 10 that electrically connects the terminal conductors 2, 4. The flexible connectors 8 also allow for a difference of movement between the two circular terminal ends. Current flowing through the MBL assembly 16 is evenly distributed 18 through the plurality of flexible connectors.

18 Claims, 4 Drawing Sheets

METHOD AND APPARATUS FOR A MULTIPLE FIN STYLE CURRENT CONNECTOR

FIELD OF THE INVENTION

The present invention relates to methods and apparatus for increasing the current capacity of a main lead to braid (MLB) assembly, while maintaining an even distribution of current across the flexible connector sub components. The MLB assembly comprises two terminal ends of conductors that have a matching series of radially spaced fins, and conductive flexible connectors joining the matching fins together.

BACKGROUND

In large scale electrical conductors, such as those used in the power generation industry, there are inherent problems in connecting electrical systems. One of the problems is that the electrical conductors will move independently of one another. This is due to the large scale mechanisms experiencing a difference of temperature, vibration or other environmental factors. If the connection point is rigid then the electrical connection wears rapidly and even breaks, which will cause shorts and other damage.

MLB assemblies have therefore been used to allow a difference of movement between two electrical conductors. One such type, typical in hydrogen inner-cooled generators, is shown in FIG. 1. In this figure, a first electrical conductor 2 is connected to a second electrical conductor 4 via a MLB assembly 6. The MLB assembly comprises a series of electrically conductive flexible connectors 8 that act as a flexible bridge between the two electrical conductors. Differences of movement between the two conductors 2, 4 can be readily absorbed by the MLB assembly 6.

Since large amounts of electricity need to pass through the MLB assembly 6, multiple flexible connectors 8 are used to attempt to spread the current evenly across the MLB assembly. However, what happens is that the current from one of the conductors 16 tends to pass in greater proportion to the outside flexible connectors 12, while little or no current passes to the inside flexible connectors 14. Therefore, the effective maximum current that this type of MLB assembly can carry is limited since increasing the number of flexible connectors 8 has a diminishing improvement on the current capacity of the MLB assembly. For example, in a MLB assembly using ten typical Penn Union™ 3"×8"×¾" copper flexible connectors that have a maximum capacity of about 3000 amps, the entire MLB assembly will have a capacity of about 27,000 amps. Further, the flexible connectors on the outer edges of the MLB assembly wear proportionally faster than the other flexible connectors since they carry a greater burden of the electrical flow. This reduces the life expectancy of the MLB assembly and creates potential safety issues.

One technique for attempting to evenly spread out the current between flexible connectors has been to arrange the flexible connectors circumferentially, as shown in FIG. 2, instead of linearly. In this figure a MLB assembly 6 comprises a series of flexible connectors 8 that are evenly spaced circumferentially around a circular MLB assembly. Current passing from one conductor 2 to another 4 is now evenly distributed 18 among the various flexible connectors 8. This design, however, is still limited by the overall size restrictions of the MLB assembly. In other words, the MLB assembly can only be so large before it creates problems with the system design. The addition of extra flexible connectors necessitates the overall increase in the diameter of the MLB assembly. Therefore, the maximum current capacity of an 8-sided version of this type of MLB assembly using typical 3"×8"×¾" copper flexible connectors is about 24,000 amps; which is less than the maximum current capacity of the conductors 2, 4 themselves, which may be upwards of 60,000 amps.

What is needed is a MLB assembly that evenly distributes electrical current among its component flexible connectors, and provides for an increased current capacity without significantly increasing the overall size.

SUMMARY OF THE INVENTION

With the foregoing in mind, methods and apparatus consistent with the present invention facilitate the creation of a MLB assembly comprising two terminal ends of conductors that have a matching series of radially spaced fins, and conductive flexible connectors joining the matching fins together. Each matched fin may have one or two flexible connectors joining it to the matching fin. Unlike conventional approaches, such as linearly spaced, or radially spaced conductive flexible connectors, the present invention allows for even distribution of an electrical current across the multiple conductive flexible connectors, and also allows for the addition of a greater number of flexible connectors without significantly increasing the overall size of the MLB assembly.

These and other objects, features, and advantages in accordance with the present invention are provided in one embodiment by a MLB assembly apparatus that is made up of a first conductor and a second conductor. The conductors each have a protrusion extending therefrom, which may be at a terminal end. A set of fins radially protruding from each protrusion and the fins from each protrusion are linearly aligned with each other. In some embodiments there are 6–10 fins on each protrusion, but this may be less or more. Multiple flexible connectors electrically connects the first set of radially protruding fins with the second set of radially protruding fins. In accordance with one embodiment there are two flexible connectors attached to each fin, one on each side. The multiple flexible connectors are attached such that they allow for a difference of movement between the first conductor and the second conductor, while still maintaining an electrical connection between the two. The electrical flow rate of the MLB assembly will depend on the number of fins and number and type of flexible connectors used. The current will flow substantially evenly through all of the flexible connectors.

DETAILED DESCRIPTION OF THE INVENTION

The present invention deals with MLB assemblies, and more particularly with MLB assemblies that have increased current flow capacity while maintaining even current through the flexible connector subcomponents. In the past, attempts have been made to either increase capacity or evenly distribute current, but so far the art has been unable to do both.

Figure 1:
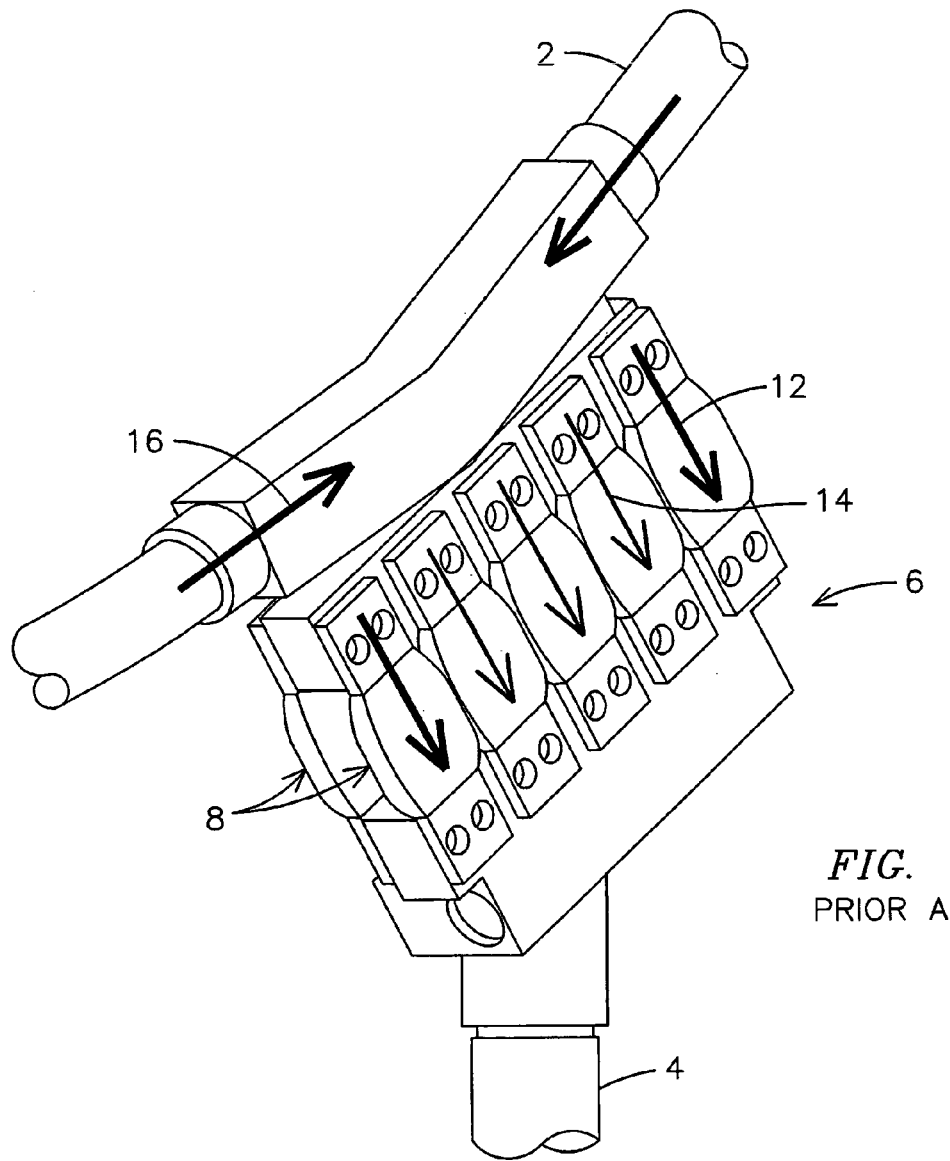
FIG. 1 illustrates a linear MLB assembly according to the prior art.

As shown in FIG. 1, the linearly placed flexible connectors 8 can carry a significant current 16, but the current tends to be carried on the outermost flexible connectors 12. This causes the outermost flexible connectors 12 to wear considerably faster than the inner flexible connectors 14. Also, since the current 16 tends to carry to the periphery, the addition of more flexible connectors 8 has a diminishing return on the net gain of current flow capacity.

Figure 2:
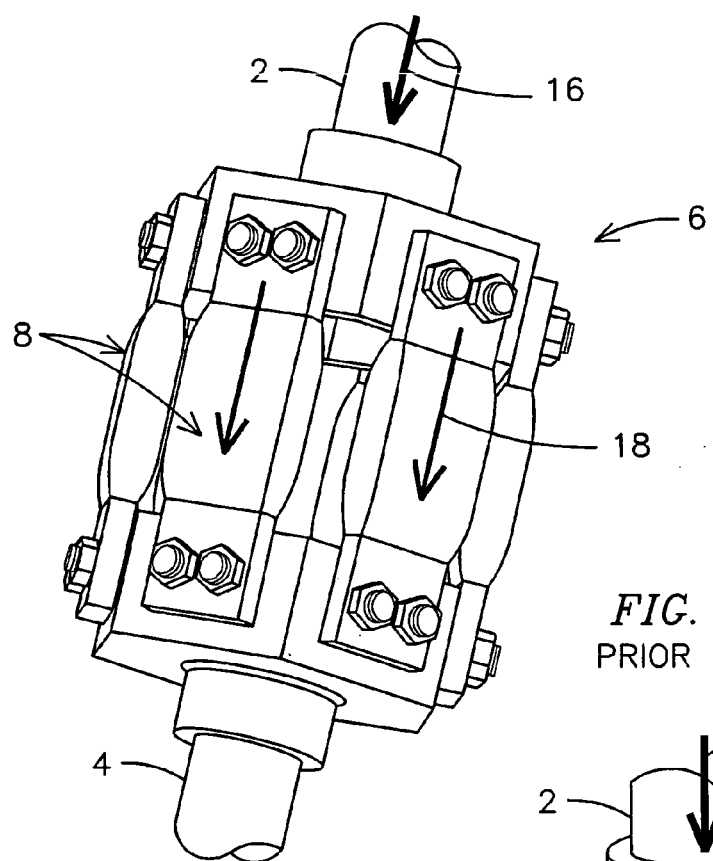
FIG. 2 illustrates a circular MLB assembly according to the prior art.

The MLB assembly 6 shown in FIG. 2 effectively spreads the current flow 16 evenly 18 among the component flexible connectors 8. This arrangement, however, tends to have less current flow capacity than the linear design when built on the same scale. In order to increase current flow capacity 16 the entire size of the MLB assembly needs to be increased as well.

Figure 3:
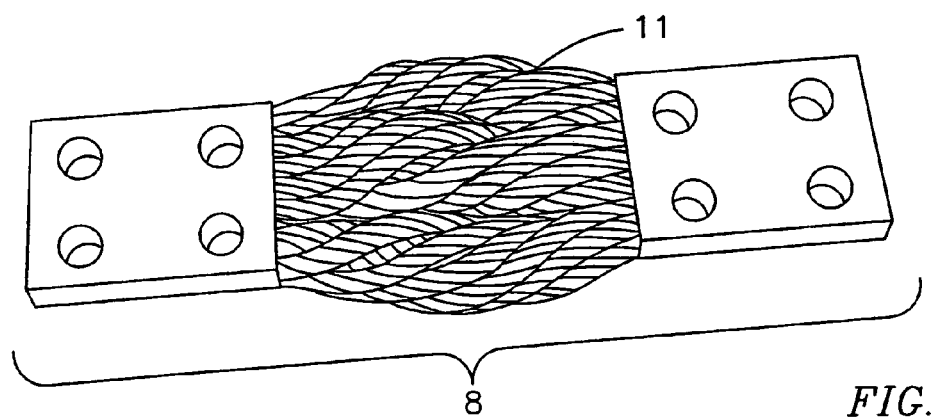
FIG. 3 illustrates a typical, uncovered flexible connector.

Flexible connectors are made primarily out of copper, but other material may be used as well. The fins themselves may be made out of any type of suitable conductive material. Copper and copper alloys are particular types used. The flexibility in the flexible connector comes from the central braided portion 11, as shown in FIG. 3. This braided portion is typically covered by a plastic sheath to preserve integrity, as is depicted in the other figures. A typical Penn Union™ flexible connector will allow for lateral movement of about three quarters of an inch, depending upon model type and how the flexible connector is installed.

Figure 4:
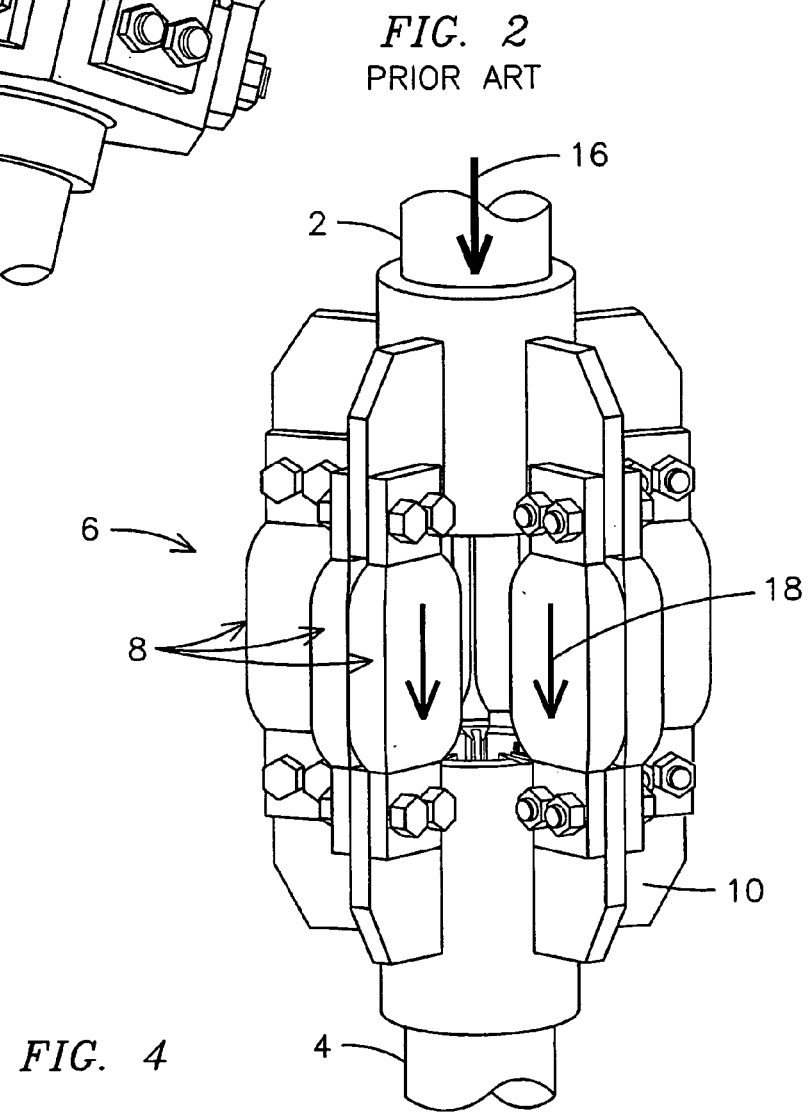
FIG. 4 illustrates a circular MLB assembly with radial fins connecting two terminal conductors according to one embodiment of the present invention.

An embodiment of the present invention shown in FIG. 4 evenly increases current flow capacity without greatly increasing size. In the present invention the connectors 2 terminate in a series of radially spaced fins 10. The flexible connectors 8 are then attached to the sides of the fins 10. This arrangement allows for a greater number of flexible connectors in the same overall space while maintaining an even current flow between them.

The number of fins used can vary depending upon factors such as overall size restrictions, as well as the size of the flexible connectors. MLB assemblies in hydrogen inner-cooled generators are typically Penn Union™ 2"×6"×½" copper flexible connectors. Such a set up would conveniently allow for 6–10 fins, although less or more fins equally fall under the concepts of this invention. In FIG. 4, each fin 10 is shown as having two flexible connectors 8 attached, one on each side of the fin. It may be desirable to have one, or no flexible connectors on any given fin. Also, the present invention contemplates more than one flexible connector per side of the fin, so that fins may have, for example, four flexible connectors attached. Though symmetry in the fin and flexible connector placement will aid in the evenness of the current flow, some variations in symmetry may benefit the overall design.

An MLB assembly as shown in FIG. 4, in a hydrogen inner-cooled power generator, with six fins and twelve flexible connectors would have a current flow capacity of about 32,000–34,000 amps. This assumes the use of using typical Penn Union™ 3"×8"×¾" copper flexible connectors. An eight-finned MLB with sixteen flexible connectors would have a current flow capacity of about 42,000–46,000 amps.

The radially extending fins in these figures are shown extending at substantially 90° from the axis of the conductor. This is a particular embodiment that allows for even access to both sides of the fin. Other embodiment may vary this angle as needed.

The flexible connectors 8 may be attached to the fins 10 by a variety of techniques known in the art such as riveting, hooking, brazing and clamping. Typically, however, they are bolted to the fins. This allows for flexibility in movement between the two conductors while maintaining sufficient electrical contact.

Figure 5:
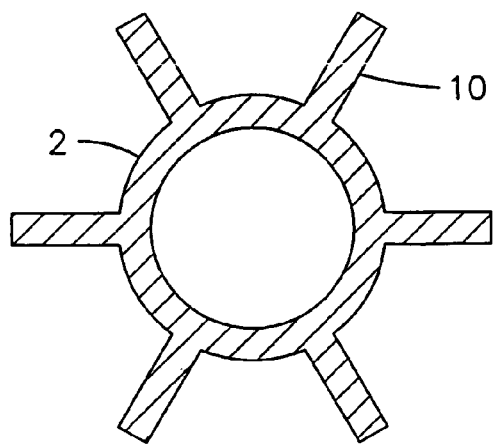
FIGS. 5 through 8 illustrate examples of different fin placements and different terminal conductor shapes.
Figure 6:
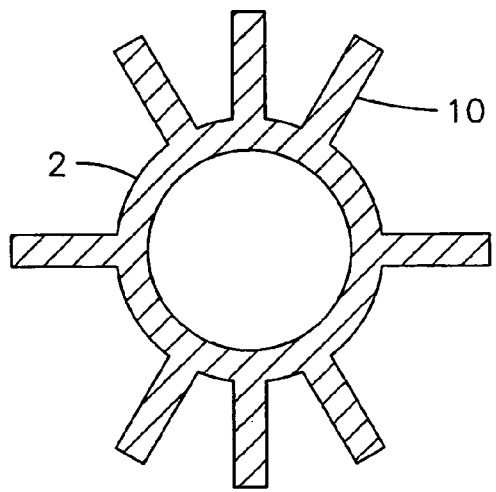
Figure 7:
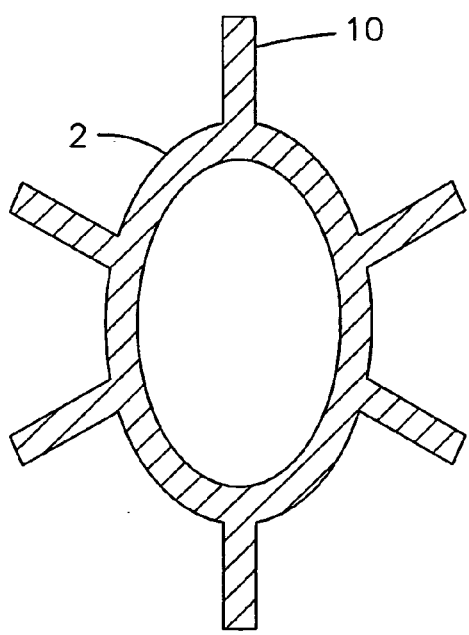
Figure 8:
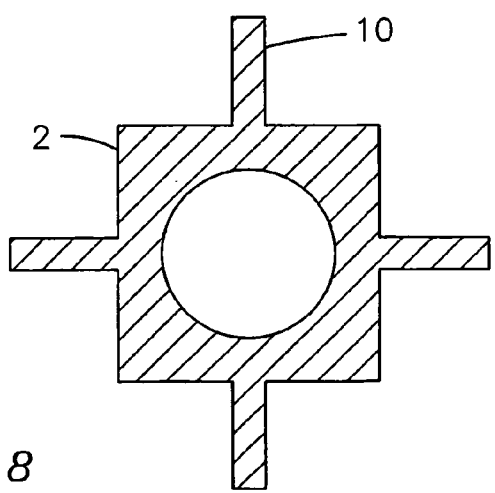

As has been shown in the embodiment of FIG. 4, the radially protruding fins 10 are evenly spaced in a circular pattern. This allows for an even flow of current through each of the flexible connectors 8. Small variations in both the spacing and the circular nature will not greatly affect the efficiency of this embodiment. FIG. 5 illustrates this embodiment in an end-on view of a terminal connector. The fins 10 are substantially evenly spaced around the end of the connector 2.

In FIG. 5 the radially protruding fins 10 are in an evenly spaced circular pattern. In this figure there are six fins 10, however, the present invention may be practiced with more or less fins as needed. For example, there may be 2–12 fins, or more particularly 6–10. In the embodiments discussed, two flexible connectors (not shown) are attached to each fin. However, some or all of the fins may have one flexible connector attached, and some may have none. In a different embodiment, some or all fins may have more than two flexible connectors attached. FIGS. 6–10 show different shape and fin spacing arrangements. These figures are merely illustrative of the various shapes and arrangements possible under the present invention are not limiting on the types of embodiments possible.

Figure 9:
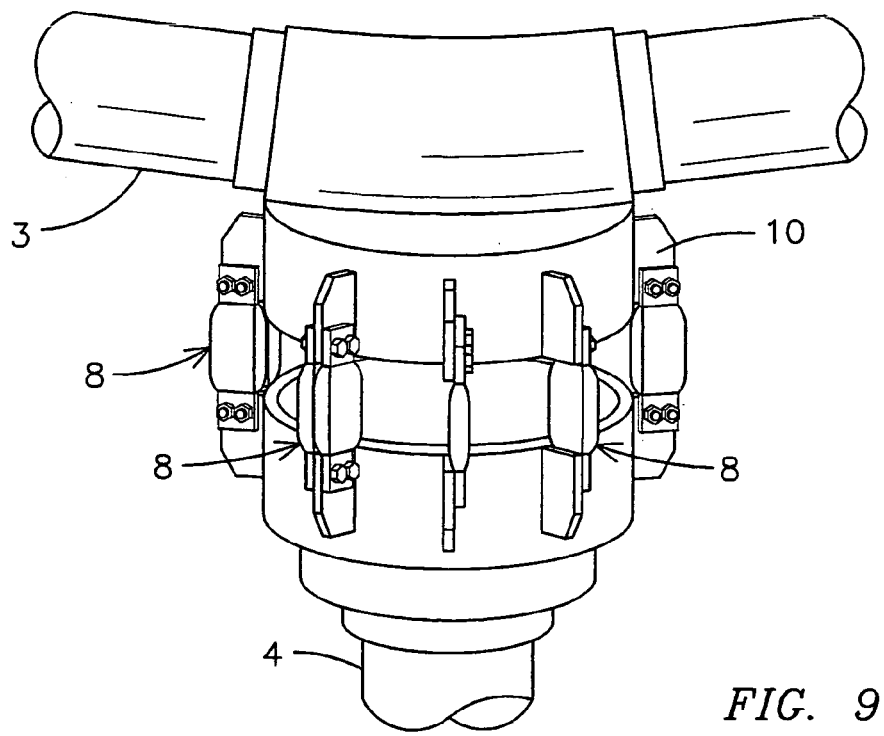
FIG. 9 illustrates a circular MLB assembly with radial fins connecting a terminal conductor with a non-terminal conductor according to one embodiment of the present invention.

FIG. 4 illustrated an embodiment of the present invention where two terminal conductors meet in an MLB assembly. The present invention is equally applicable to conductors that need to be connected at different points. An example of this is shown in FIG. 9. In this embodiment of the present invention, a non-terminal conductor 3 is joined to a terminal connector 4 by flexible connectors according to the present invention.

Figure 10:
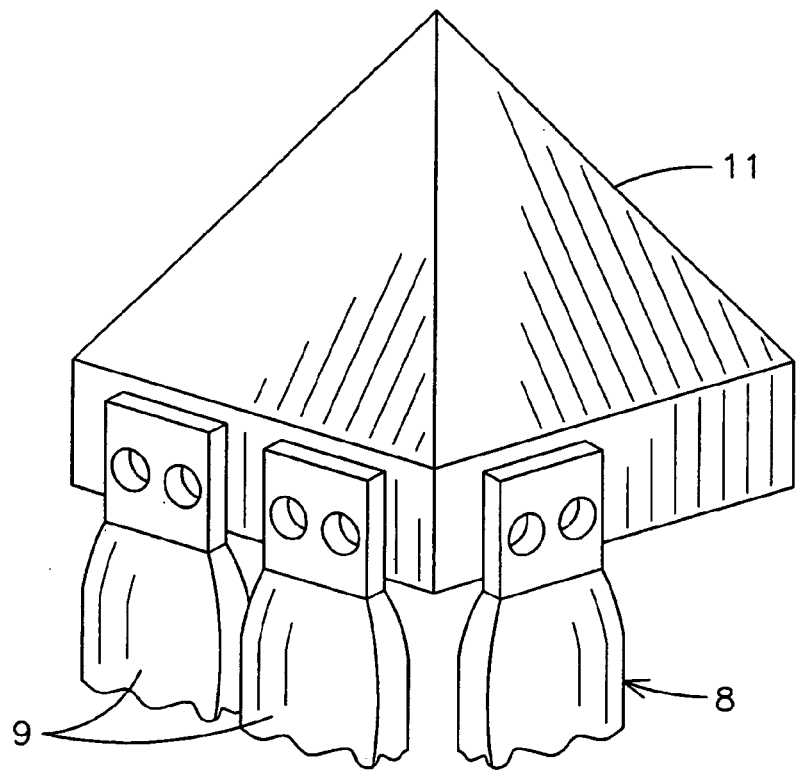
FIG. 10 illustrates a pyramidal shaped fin as one example of the various types of fin shapes that may be practiced with the present invention.

Referring to FIG. 10, a triangular/pyramid shaped fin is shown 11. Previous figures have shown the use of blade-type fins. This figure shows another example of the many different shapes that the fins of the present invention may take. Other's include but are not limited to trapezoidal, square and oblong. The flexible connectors may be placed on such fins in a variety of configurations, such as singly, or two side by side 9.

In the particular embodiments shown, the fins are described as protruding radially from a conductor. It is equivalent that the fins may extend down from a conductor without seemingly protruding from a cross sectional view. In this embodiment, the conductor would appear to end in a series of fins, to which the flexible connectors are attached. It is also equivalent that the fins may extend down from a conductor, and protrude radially from a cross sectional view.

Though one embodiment of the present invention is practiced on large scale, hydrogen inner-cooled generators, the invention may be practiced on different models and scales as required. For example, the present invention may be practiced on conventionally cooled generators ranging from 190 MVA to 550 MVA and water cooled generators ranging from 500 MVA to 2200 MVA. An expected use of the present invention is to be the Olkiluoto3 (Fin5)™ water cooled generator to be produced by Siemens Westinghouse™.

In one embodiment the present invention is an MLB assembly that is made up of two circular terminal conductor ends. Multiple fins radially extend from each of the two circular terminal conductor ends, and each fin on each of the two circular terminal conductor ends has a matching fin on the other of the two circular terminal ends. Multiple flexible connectors are attached to the fins that electrically connects the terminal conductors. The flexible connectors also allow for a difference of movement between the two circular terminal ends. Current flowing through the MBL assembly is evenly distributed through the plurality of flexible connectors.

In a particular embodiment the MLB assembly is used in a hydrogen inner-cooled generator. In this embodiment the fins are blade-type, and are evenly spaced around the terminal conductor ends.

In a related embodiment the flexible connectors are connected to the matching fins by bolts. The number of matching fins may be varied, but in one embodiment is from 6–10. Each fin is connected by two flexible connectors. The flexible connectors in this embodiment are composed primarily of copper and the flow capacity of the MLB assembly is approximately 44,000 amps.

In another embodiment, the present invention comprises an MLB assembly that is made up of a first conductor and a second conductor. The conductors each have a protrusion extending there from, which may be at a terminal end. A set of fins radially protruding from each protrusion and the fins from each protrusion are linearly aligned with each other, i.e. the fins one the two connectors are matched so that they may be joined by flexible connectors. In some instances there are 6–10 fins on each protrusion, but this may be less or more. Multiple flexible connectors electrically connects the first set of radially protruding fins with the second set of radially protruding fins. Typically there are two flexible connectors attached to each fin, one on each side. The multiple flexible connectors are attached such that they allow for a difference of movement between the first conductor and the second conductor, which still maintaining an electrical connection between the two. The electrical flow rate of the MLB assembly will depend on the number of fins and number and type of flexible connectors used. Ideally the current will flow through all of the flexible connectors substantially evenly.

In still another embodiment, the present invention is a method for making an MLB assembly by connecting a first conductor with a second conductor. A first set of fins are radially extended from a connection point on the first connector and a second set of fins are radially extended from a connection point on the second connector, and at least a portion of fins on the first set of fins matches at least a portion of fins on the second set of fins. These matching pairs of fins are then connected with at least one flexible connector per the matching fin pair, and the first connector and the second connector are flexibly joined and are in electrical contact.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

We claim:

1. An MLB assembly apparatus comprising:
   two substantially circular terminal conductor ends;
   a plurality of fins radially extending from each of said two terminal conductor ends, wherein each fin on each of said two terminal conductor ends has a corresponding fin on the other of said two circular terminal ends; and
   a plurality of flexible connectors that electrically connect said fins on one of said two circular terminal ends to the fin on the other of said two circular terminal ends;
   wherein said plurality of flexible connectors allow for a difference of movement between said two circular terminal ends;
   wherein said two circular terminal conductor ends are electrically connected and wherein a current flowing through said MLB assembly is evenly distributed through said plurality of flexible connectors.

2. The MLB assembly apparatus as in claim 1, wherein said plurality of flexible connectors are connected to said matching fins by bolts.

3. The MLB assembly apparatus as in claim 1, wherein said MLB assembly is part of a hydrogen inner-cooled generator.

4. The MLB assembly apparatus of claim 1, comprising 6–10 fins.

5. The MLB assembly apparatus as in claim 1, wherein two of said flexible connectors electrically connects said fins on one of said two circular terminal ends to the fin on the other of said two circular terminal ends.

6. The MLB assembly apparatus as in claim 1, wherein said plurality of flexible connectors are evenly spaced around said MLB assembly.

7. The MLB assembly apparatus as in claim 1, wherein the flow capacity of said MLB assembly is approximately 44,000 amps.

8. An MLB assembly apparatus comprising:
   a first conductor;
   a second conductor;
   a first circular protrusion on said first cnductor having a first set of radially protruding fins;
   a second circular protrusion on said second conductor having a second set of radially protruding fins, wherein said first set of radially protruding fins are linearly aligned with said second set of radially protruding fns; and
   a plurality of flexible connectors that electrically connects said first set of radially protruding fins with said second set of radially protruding fins;
   wherein a current flowing through said first conductor and said second conductor is substantially evenly distributed through said plurality of flexible connectors.

9. The MLB apparatus as in claim 8, wherein said first protrusion is located at a terminal end of said first connector.

10. The MLB assembly apparatus as in claim 8, wherein said first protrusion is located in a middle portion of said first connector.

11. The MLB assembly apparatus as in claim 8, wherein said first set of radially protruding fins an said second set of radially protruding fins comprises 6 to 8 fins each.

12. The MLB assembly apparatus as in claim 8, wherein said MLB assembly has a flow capacity of approximately 44,000 amps.

13. The MLB assembly apparatus as in claim 8, wherein two of said plurality of flexible connectors connect each fin in said first set of radially protruding fins to fins in said second set of radially protruding fins.

14. The MLB assembly apparatus as in claim 8, wherein all of said fins are blade-type.

15. A method of connecting a first conductor with a second conductor comprising:
   extending a first set of fins radially from a connection point on said first connector and extending a second set of fins radially from a connection point on said second connector, wherein at least a portion of fins on said first set of fins matches at least a portion of fins on said second set of fins, producing a plurality of matching fin pairs;
   aligning said first conductor and said second conductor; and
   connecting said matching fin pairs with at least one flexible connector per said matching fin pair;
   wherein said first connector and said second connector are flexibly joined and are in electrical contact.

16. The method of claim 15, wherein said first connection point occurs at a terminal end of said first connector and said second connection point occurs at a terminal end of said second connector.

17. The method of claim 15, wherein all of said fins are blade-type.

18. The method of claim 15, wherein said MLB assembly has a flow capacity of approximately 44,000 amps.

* * * * *